United States Patent
Yoshihara et al.

(10) Patent No.: US 8,731,606 B2
(45) Date of Patent: May 20, 2014

(54) COMMUNICATION SYSTEM, MOBILE STATION DEVICE, CONNECTION DESTINATION EVALUATING METHOD, CONNECTION DESTINATION EVALUATING PROGRAM, AND BASE STATION DEVICE

(75) Inventors: Akio Yoshihara, Osaka (JP); Hirokazu Kobayashi, Osaka (JP); Shinichi Sawada, Osaka (JP); Shigeto Suzuki, Osaka (JP); Kohki Suzuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 134 days.

(21) Appl. No.: 13/388,944

(22) PCT Filed: Jul. 30, 2010

(86) PCT No.: PCT/JP2010/062894
§ 371 (c)(1),
(2), (4) Date: Feb. 3, 2012

(87) PCT Pub. No.: WO2011/016397
PCT Pub. Date: Feb. 10, 2011

(65) Prior Publication Data
US 2012/0135738 A1  May 31, 2012

(30) Foreign Application Priority Data

Aug. 7, 2009 (JP) .................. P2009-184365

(51) Int. Cl.
*H04M 1/00* (2006.01)
(52) U.S. Cl.
USPC .............. 455/552.1; 455/435.3; 455/453
(58) Field of Classification Search
USPC ........... 455/452.1, 453, 3.03, 3.04, 435.1, 455/550.1, 552.1
See application file for complete search history.

(56) References Cited

U.S. PATENT DOCUMENTS

| | | | | |
|---|---|---|---|---|
| 5,729,542 A * | 3/1998 | Dupont | ........................ | 370/346 |
| 2006/0099952 A1* | 5/2006 | Prehofer | ........................ | 455/440 |
| 2009/0088131 A1* | 4/2009 | Gholmieh et al. | ............ | 455/410 |

OTHER PUBLICATIONS

3GPP TS 22.011 V8.5.0 (Sep. 2008), Technical Specification Group Services and System Aspects; Service accessibility (Release 8).
3GPP TS 36.304 V8.5.0 (Mar. 2009), Technical Specification Group Radio Access Network; Evolved Universal Terrestrial Radio Access (E-UTRA); User Equipment (UE) procedures in idle mode (Release 8).

(Continued)

*Primary Examiner* — Vladimir Magloire
(74) *Attorney, Agent, or Firm* — Birch, Stewart, Kolasch & Birch, LLP

(57) ABSTRACT

A priority storing unit (b117) stores, for each of frequency bands predetermined, a priority for accessing a base station device using associated one of the frequency bands. A service type determining unit (b114) chooses, based on identification information received from the at least one first base station device, which of the first and second services to receive from each of the at least one first base station device. A priority determining unit (b116) determines, based on a type of a connection service chosen by the service type determining unit (b114), a priority for each of the frequency bands which is used by the at least one first base station device, and to update the priority stored by the priority storing unit (b117) based on the priority determined. A selection evaluator (b119) selects a base station device to access, based on the priority updated by the priority determining unit (b116) and a reception level of a reception signal for each of the frequency bands which is received from each of the base station devices.

12 Claims, 14 Drawing Sheets

| CELL ID | CELL TYPE | SERVICE FREQUENCY | CSG IDENTIFIER | SERVICE TYPE | RECEPTION LEVEL |
|---|---|---|---|---|---|
| C1 | | Ch01 | – | NORMAL | 8 |
| C2 | CSG | Ch01 | 2 | × | 6 |
| C3 | HYBRID | Ch02 | 1 | CSG | 6 |
| C4 | CSG | Ch03 | 1 | CSG | 4 |
| C5 | HYBRID | Ch03 | 3 | NORMAL | 2 |
| C6 | CSG | Ch03 | – | – | 1 |
| ... | ... | ... | ... | ... | ... |

(56) References Cited

OTHER PUBLICATIONS

3GPP TS 36.331 V8.5.0 (Mar. 2009), Technical Specification Group Radio Access Network; Evolved Universal Terrestrial Radio Access (E-UTRA) Radio Resource Control (RRC); Protocol specification (Release 8).

3GPP TSG RAN Working Group 2 Meeting #66 San Francisco, R2-092721, "Draft Report of 3GPP TSG RAN WG2 Meeting #65bis", Seoul, Korea, Mar. 23-27, 2009.

3GPP TSG-RAN WG2 Meeting #66bis R2-093950, Open Issues for Hybrid/Open Cells Jun. 23, 2009.

3GPP TSG-RAN WG2 Meeting #66bis, R2-093755, Proposed CR for Hybrid cell (36.304), Jun. 23, 2009.

\* cited by examiner

FIG. 4

| SERVICE FREQUENCY | Ch01 | Ch02 | Ch03 | ... |
|---|---|---|---|---|
| PRIORITY | 6 | 4 | 2 | ... |

FIG. 5

| CELL ID | CELL TYPE | SERVICE FREQUENCY | CSG IDENTIFIER | SERVICE TYPE | RECEPTION LEVEL |
|---|---|---|---|---|---|
| C1 |  | Ch01 | - | NORMAL | 8 |
| C2 | CSG | Ch01 | 2 | × | 6 |
| C3 | HYBRID | Ch02 | 1 | CSG | 6 |
| C4 | CSG | Ch03 | 1 | CSG | 4 |
| C5 | HYBRID | Ch03 | 3 | NORMAL | 2 |
| C6 | CSG | Ch03 | - | - | 1 |
| ... | ... | ... | ... | ... | ... |

FIG. 6

| SERVICE FREQUENCY | Ch01 | Ch02 | Ch03 | ... |
|---|---|---|---|---|
| PRIORITY | 6 | 8 | 8 | ... |

FIG. 10

| SERVICE FREQUENCY | Ch01 | Ch02 | Ch03 | ... |
|---|---|---|---|---|
| PRIORITY | 6 | 4 | 8 | ... |

FIG. 14

| SERVICE FREQUENCY | Ch04 | Ch05 | ... |
|---|---|---|---|
| PRIORITY | 5 | 4 | ... |

FIG. 15

| CELL ID | CELL TYPE | SERVICE FREQUENCY | CSG IDENTIFIER | SERVICE TYPE | RECEPTION LEVEL |
|---|---|---|---|---|---|
| C7 | HYBRID | Ch04 | 3 | CSG | 6 |
| C8 | NORMAL | Ch04 | - | NORMAL | 3 |
| C9 | CSG | Ch05 | 3 | CSG | 4 |
| C10 | NORMAL | C50 | - | NORMAL | 2 |
| ... | ... | ... | ... | ... | ... |

FIG. 16

| SERVICE FREQUENCY | Ch04 | Ch05 | ... |
|---|---|---|---|
| PRIORITY | 8 | 9 | ... |

FIG. 18

| SERVICE FREQUENCY | Ch04 | Ch05 | ... |
|---|---|---|---|
| PRIORITY | 8 | 8 | ... |

COMMUNICATION SYSTEM, MOBILE STATION DEVICE, CONNECTION DESTINATION EVALUATING METHOD, CONNECTION DESTINATION EVALUATING PROGRAM, AND BASE STATION DEVICE

TECHNICAL FIELD

The present invention relates to a communication system, a mobile station device, a connection destination evaluating method, a connection destination evaluating program, and a base station device.

Priority is claimed on Japanese Patent Application No. 2009-184365, filed Aug. 7, 2009, the content of which is incorporated herein by reference.

BACKGROUND ART

Regarding W-CDMA (Wideband Code Division Multiple Access), LTE (Long Term Evolution), and LTE-A (LTE-Advance), introducing a small radio base station Home (e)Node B has been considered for the purposes of expansion of service areas, individual use, and the like. The types of cells provided by the Home (e)Node B include: a normal cell which allows all users to access thereto; a CSG (Closed Subscriber Group) cell which allows only specific users to access thereto; and a hybrid cell which allows part of users (mobile station devices) to access thereto as a CSG cell and which allows other users to access thereto as a normal cell. The standardization thereof has been in process by 3GPP (3rd Generation Partnership Project).

The CSG cell is described in the section 8 of Non-Patent Document 1. The hybrid cell is described in Non-Patent Document 2.

Specifically, Non-Patent Document 2 describes that whether the mobile station device accesses the hybrid cell as the CSG cell or the normal cell, that is, connection service of which cell to select, is determined by the following steps.

A CSG identifier (CSG ID) included in system information reported from a base station device serving the hybrid cell is obtained (Step 1). It is confirmed whether or not the received CSG identifier is included in an allowed CSG list stored by the mobile station device (Step 2). If the CSG identifier is included in the allowed CSG list, the mobile station device accesses the hybrid cell as a CSG cell. If the CSG identifier is not included in the allowed CSG list, or if the mobile station device is not compatible with the CSG, the mobile station device accesses the hybrid cell as a normal cell.

On the other hand, among parameters to be used by a mobile station device, a parameter reported from a network through a base station device is defined in Non-Patent Document 3.

For example, in the case of the LTE, each service frequency has a cell reselection priority, which is used at the time of cell reselection evaluation. Here, a value of the cell reselection priority is set in the range of 0 to 7. The greater value indicates the higher priority. Here, the cell reselection priority is reported to a cell by system information.

Additionally, in the section 5.2 of Non-Patent Document 4, definitions of the cell reselection evaluation for the LTE are given for the following cases of (D1) to (D3).

(D1) If the cell reselection priority of a cell to be subjected to cell reselection evaluation (referred to as an evaluating cell) is higher than the cell reselection priority of a cell on which a UE currently camps (referred to as a serving cell), a handover to the evaluating cell is performed if the reception level of the evaluating cell ($S_{nonServingCell, x}$) is kept higher than a threshold ($Thresh_{x, high}$) for a given duration ($Treselection_{RAT}$).

(D2) If the cell reselection priority of the evaluating cell is equal to the cell reselection priority of the serving cell, cells are ranked according to the reception levels, and a handover to the evaluating cell is performed if the rank of the evaluating cell is kept higher than the rank of the serving cell for a given duration ($Treselection_{RAT}$).

(D3) If the cell reselection priority of the evaluating cell is lower than the cell reselection priority of the serving cell, a handover to the evaluating cell is performed if a state, in which the reception level of the serving cell ($S_{ServingCell}$) is lower than a threshold ($Thresh_{serving, low}$) and the reception level of the evaluating cell ($S_{nonServingCell, x}$) is higher than another threshold ($Thresh_{x, low}$), is kept for a given duration ($Treselection_{RAT}$).

The above definitions of the cell reselection evaluation for the LTE indicate that the determination of the handover in the above case of (D1) is performed based only on the reception level of the evaluating cell. On the other hand, the above definitions indicate that the reception level of the evaluating cell exceeds the reception level of the serving cell in the above case of (D2). The above definitions indicate that both the evaluating cell and the serving cell meet the given criteria in the above case of (D3). In other words, the cell reselection criteria become stricter as the cell reselection priority decreases. For this reason, a system is configured such that the mobile station device preferentially selects a cell with a higher cell reselection priority.

In addition, it has been defined that the mobile station device determines, for a CSG cell, a cell reselection priority different from the reported cell reselection priority (implicit priority). According to this definition, if the reception level of the CSG cell is the highest with respect to a frequency, the cell reselection priority with respect to that frequency is assumed to be the highest. Additionally, if the serving cell is a CSG, the cell reselection priority with respect to that frequency is assumed to be the highest.

CITATION LIST

[Non-Patent Document]

[Non-Patent Document 1] 3GPP TS 22.011 v8.5.0: "Service accessibility"

[Non-Patent Document 2] 3GPP RAN2 #66 R2-092721: "Draft Report of 3GPP RAN WG2 meeting #65bis"

[Non-Patent Document 3] 3GPP TS 36.331 v8.5.0: "Radio Resource Control (RRC)-Protocol Specification"

[Non-Patent Document 4] 3GPP TS 36.304 v8.5.0: "UE Procedure in Idle Mode"

DISCLOSURE OF THE INVENTION

Problems to be Solved by the Invention

However, a method (cell reselection evaluation) for a mobile station device to evaluate, as a connection destination, a cell that provides multiple connection services with different service qualities (hybrid cell) has not been defined. For this reason, there has been a demerit such that the conventional mobile station device cannot perform cell reselection evaluation on a hybrid cell, and therefore cannot access the hybrid cell or perform a handover from the hybrid cell to another cell.

Additionally, even if the priority of the hybrid cell is predetermined and evaluation is made using the evaluation method disclosed in Non-Patent Document 4, there has been a demerit such that even when there is a cell providing better quality service, a handover to a cell providing lower quality service than that cell is performed in some cases.

As explained above, according to the related art, there has been a demerit such that it is impossible to evaluate a cell providing multiple connection services with different service qualities, and therefore it is impossible to access a base station device serving a cell providing high quality service.

The present invention has been made in view of the above situations. An object of the present invention is to provide a communication system, a mobile station device, a connection destination evaluating method, a connection destination evaluating program, and a base station device, which enables access to a base station device serving a cell providing high quality service.

Means for Solving the Problems (1) The present invention has been made to solve the above problems. The present invention is a communication system including: a plurality of base station devices including at least one first base station device configured to provide one of first and second services to a mobile station device, the second connection service being lower in service quality than the first connection service; and a mobile station device configured to communicate with the base station devices. The mobile station device includes: a priority storing unit configured to store, for each of frequency bands predetermined, a priority for accessing a base station device using associated one of the frequency bands; a service type determining unit configured to choose, based on identification information received from the at least one first base station device, which of the first and second services to receive from each of the at least one first base station device; a priority determining unit configured to determine, based on a type of a connection service chosen by the service type determining unit, a priority for each of the frequency bands which is used by the at least one first base station device, and to update the priority stored by the priority storing unit based on the priority determined; and a selection evaluator configured to select a base station device to access, based on the priority updated by the priority determining unit and a reception level of a reception signal for each of the frequency bands which is received from each of the base station devices.

(2) Regarding the communication system according to the present invention, the priority determining unit is configured to determine, to be the highest priority, the priority for each of the frequency bands which is used by the at least one first base station device from which the service type determining unit chooses to receive the first connection service.

(3) Regarding the communication system according to the present invention, the priority stored by the priority storing unit is a priority received from the base station device. The priority determining unit is configured to determine, to be the priority received from the base station device, the priority for each of the frequency bands which is used by at least one first base station device from which the service type determining unit chooses to receive the second connection service.

(4) Regarding the communication system according to the present invention, the base station device includes: a priority control information generator configured to generate priority control information to be transmitted to the mobile station device, the priority control information indicating whether or not the mobile station device is to update the priority. The priority determining unit is configured to update the priority if the priority control information received from the base station device indicates that the priority is to be updated. The priority determining unit is configured not to update the priority if the priority control information received from the base station device indicates that the priority is not to be updated.

(5) Regarding the communication system according to the present invention, the plurality of base station devices includes at least one second base station device configured to provide only the first connection service to the mobile station device. The priority determining unit is configured to determine, to be lower than a priority for each of the frequency bands which is used by the at least one second base station device, the priority for each of the frequency bands which is used by the at least one first base station device from which the service type determining unit chooses to receive the first connection service.

(6) Regarding the communication system according to the present invention, the priority determining unit is configured to determine, to be the highest priority, the priority for each of the frequency bands which is used by the at least one first base station device, the first connection service being received from the at least one first base station device which is connected.

(7) Regarding the communication system according to the present invention, the plurality of base station devices includes at least one second base station device configured to provide only the first connection service. The priority determining unit is configured to determine, to be lower than a priority for each of the frequency bands which is used by the at least one second base station device, the priority for each of the frequency bands which is used by the at least one first base station device, the first connection service being received from the at least one first base station device which is connected.

(8) Regarding the communication system according to the present invention, the plurality of base station devices includes at least one second base station device configured to provide only the first connection service. The priority determining unit is configured to determine, to be identical to a priority for each of the frequency bands which is used by the at least one second base station device, the priority for each of the frequency bands which is used by the at least one first base station device, the first connection service being received from the at least one first base station device which is connected.

(9) Regarding the communication system according to the present invention, the selection evaluator is configured to select, as a base station device to access, a base station device using a frequency band to be evaluated, if the frequency band to be evaluated is higher in priority than a frequency band used by the base station device connected, and if the reception level with respect to the frequency band to be evaluated is higher than a predetermined threshold. The selection evaluator is configured to select, as a base station device to access, the base station device using the frequency band to be evaluated, if the frequency band to be evaluated has the same priority to that of the frequency band used by the base station device connected, and if the reception level with respect to the frequency band to be evaluated is higher than the reception level with respect to the frequency band used by the base station device connected. The selection evaluator is configured to select, as a base station device to access, the base station device using the frequency band to be evaluated, if the frequency band to be evaluated is lower in priority than the frequency band used by the base station device connected, if the reception level with respect to the frequency band to be evaluated is higher than the predetermined threshold, and if the reception level with respect to the frequency band used by the base station device connected is lower than a predetermined threshold.

(10) Additionally, the present invention is a mobile station device configured to communicate with a plurality of base station devices including at least one first base station device configured to provide one of first and second services to a mobile station device, the second connection service being lower in service quality than the first connection service. The mobile station device includes: a priority storing unit configured to store, for each of frequency bands predetermined, a priority for accessing a base station device using associated one of the frequency bands; a service type determining unit configured to choose, based on identification information received from the at least one first base station device, which of the first and second services to receive from each of the at least one first base station device; a priority determining unit configured to determine, based on a type of a connection service chosen by the service type determining unit, a priority for each of the frequency bands which is used by the at least one first base station device, and to update the priority stored by the priority storing unit based on the priority determined; and a selection evaluator configured to select a base station device to access, based on the priority updated by the priority determining unit and a reception level of a reception signal for each of the frequency bands which is received from each of the base station devices.

(11) Additionally, the present invention is a connection destination evaluating method for a mobile station device configured to communicate with a plurality of base station devices including at least one first base station device configured to provide one of first and second services to a mobile station device, the second connection service being lower in service quality than the first connection service. The mobile station device includes a priority storing unit configured to store, for each of frequency bands predetermined, a priority for accessing a base station device using associated one of the frequency bands. The connection destination evaluating method includes: a service type determining step for a service type determining unit to choose, based on identification information received from the at least one first base station device, which of the first and second services to receive from each of the at least one first base station device; a priority determining step for a priority determining unit to determine, based on a type of a connection service chosen by the service type determining unit, a priority for each of the frequency bands which is used by the at least one first base station device, and to update the priority stored by the priority storing unit based on the priority determined; and a selection evaluating step for a selection evaluator to select a base station device to access, based on the priority updated by the priority determining unit and a reception level of a reception signal for each of the frequency bands which is received from each of the base station devices.

(12) Additionally, the present invention is a connection destination evaluating program causing a computer of a mobile station device configured to communicate with a plurality of base station devices including at least one first base station device configured to provide one of first and second services to a mobile station device, the second connection service being lower in service quality than the first connection service, and the mobile station device including a priority storing unit configured to store, for each of frequency bands predetermined, a priority for accessing a base station device using associated one of the frequency bands, to function as: a service type determining unit configured to choose, based on identification information received from the at least one first base station device, which of the first and second services to receive from each of the at least one first base station device; a priority determining unit configured to determine, based on a type of a connection service chosen by the service type determining unit, a priority for each of the frequency bands which is used by the at least one first base station device, and to update the priority stored by the priority storing unit based on the priority determined; and a selection evaluator configured to select a base station device to access, based on the priority updated by the priority determining unit and a reception level of a reception signal for each of the frequency bands which is received from each of the base station devices.

(13) Additionally, the present invention is a base station device configured to provide one of first and second services to a mobile station device, the second connection service being lower in service quality than the first connection service. The base station device includes: a priority control information generator configured to generate priority control information to be transmitted to the mobile station device, the priority control information indicating whether or not the mobile station device is to update a priority.

Effects of the Invention

According to the present invention, it is possible to evaluate a cell providing multiple connection services with different service qualities and to access a base station device serving a cell providing high quality service.

BRIEF DESCRIPTION OF THE DRAWINGS

FIG. 4 is a schematic diagram illustrating an example of a priority information table according to the first embodiment.

FIG. 5 is a schematic diagram illustrating an example of a cell information table according to the first embodiment.

FIG. 6 is a schematic diagram illustrating another example of a priority information table according to the first embodiment.

FIG. 10 is a schematic diagram illustrating an example of a priority information table according to the second embodiment.

FIG. 14 is a schematic diagram illustrating an example of a priority information table according to the third embodiment.

FIG. 15 is a schematic diagram illustrating an example of a cell information table according to the third embodiment.

FIG. 16 is a schematic diagram illustrating another example of a priority information table according to the third embodiment.

FIG. 18 is a schematic diagram illustrating an example of a priority information table according to a modified example.

BEST MODE FOR CARRYING OUT THE INVENTION (First Embodiment)

Hereinafter, embodiments of the present invention are explained in detail with reference to the drawings.

(Regarding Communication System 1)

Figure 1:
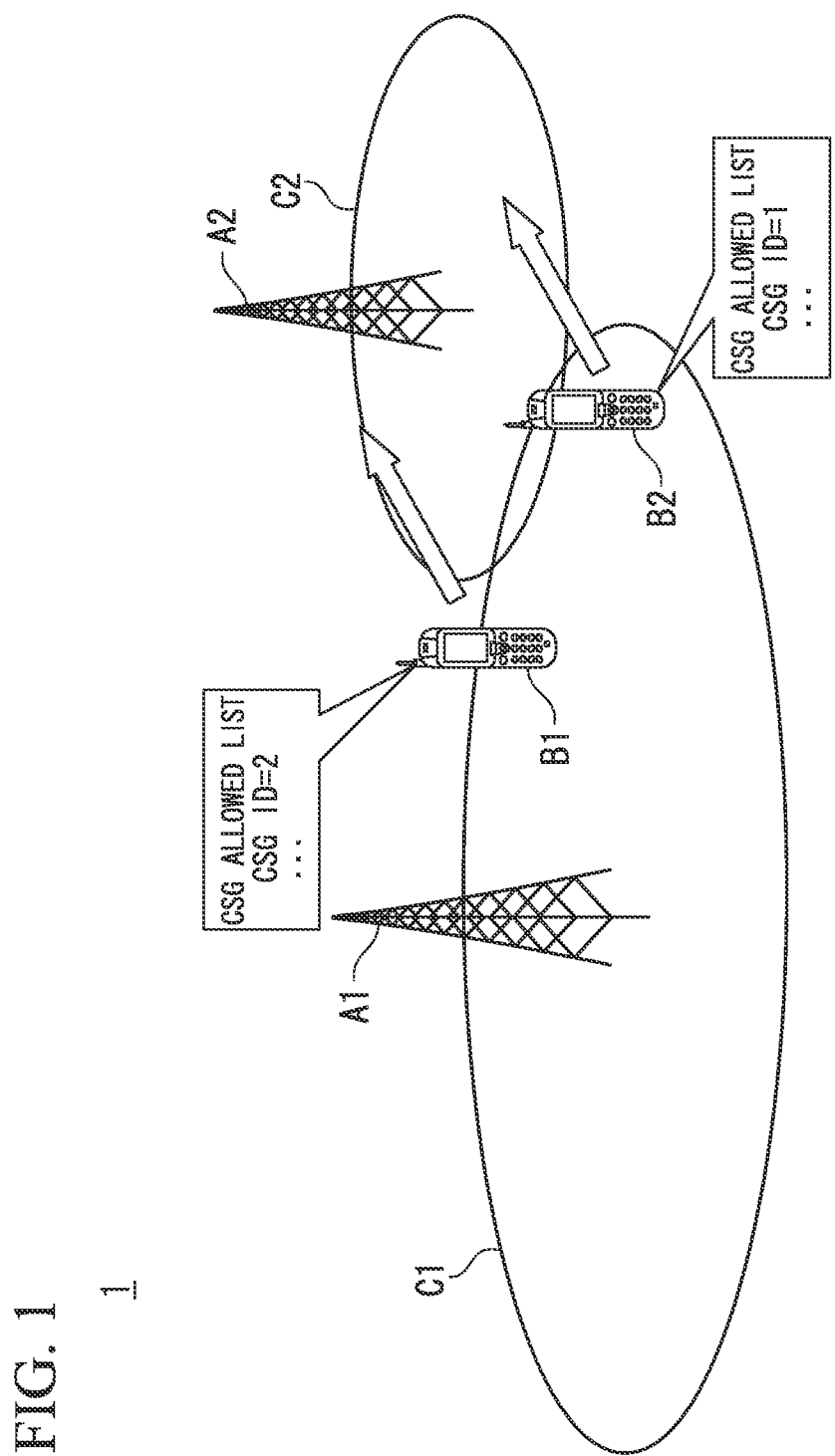
FIG. 1 is a schematic diagram illustrating a communication system according to a first embodiment of the present invention.

FIG. 1 is a schematic diagram illustrating a communication system 1 according to a first embodiment of the present invention. In FIG. 1, cells C1 and C2 denote communication areas of base station devices A1 and A2, respectively. Additionally, the type of the cell C1 is any one of a normal cell which allows all users to access thereto, a CSG (Closed Subscriber Group) cell which allows specific users to access thereto, and a hybrid cell which allows part of users (mobile station devices) to access thereto as a CSG cell and which allows other users to access thereto as a normal cell by (hereinafter, such a type is referred to as the cell type). In the CSG cell, high-value added services, such as higher communication speed, larger communication capacity, or lower communication fees, compared to the normal cell, are provided to subscribers.

Additionally, this drawing shows that the cell type of the cell C2 is a hybrid cell, and a CSG identifier (CSG ID) of the cell C2 is "1." In other words, in the cell C2, the base station device A2 provides either connection service of the CSG cell (first connection service) or connection service of a normal cell which is lower in quality than the connection service of the CSG cell.

In FIG. 1, the mobile station devices B1 and B2 camp on the cell C1. This drawing shows that the mobile station devices B1 and B2 previously store allowed CSG lists. Additionally, this drawing shows that a CSG identifier "1" of the cell C2 is included in the allowed CSG list of the mobile station device B2, and a CSG identifier having a value of "1" is not included in the allowed CSG list of the mobile station device B1.

In the first embodiment, the mobile station device B1, which stores the allowed CSG list not including the CSG identifier "1" of the cell C2, performs cell reselection evaluation while regarding the cell C2 as a normal cell. On the other hand, the mobile station device B2, which stores the allowed CSG list including the CSG identifier "1" of the cell C2, performs cell reselection evaluation while regarding the cell C2 as a CSG cell. If the mobile station devices B1 and B2 determine to perform handover to the cell C2 as results of the cell reselection evaluation, the mobile station devices B1 and B2 perform processes of handover to the cell C2.

Hereinafter, explanations are given where the base station device A2 is regarded as a base station device a1, and the mobile station devices B1 and B2 are regarded as mobile station devices b1.

(Regarding Configuration of Base Station Device a1)

Figure 2:
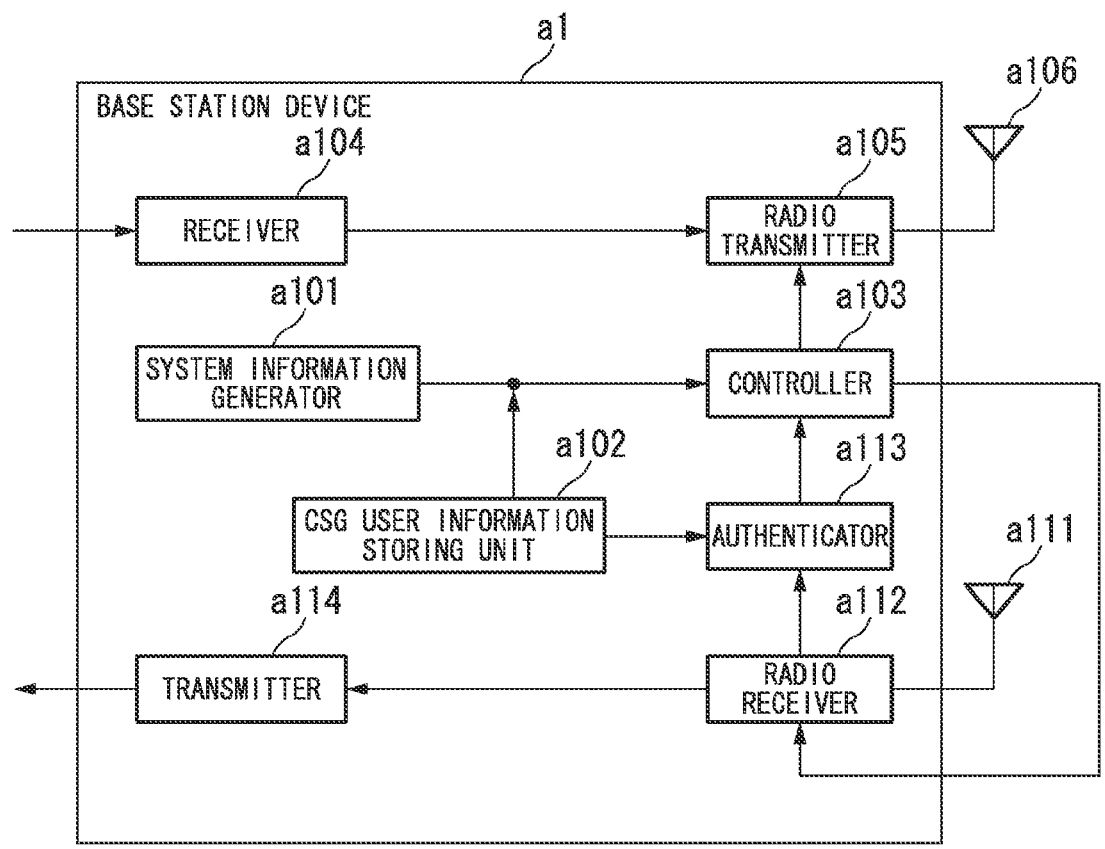
FIG. 2 is a schematic block diagram illustrating a configuration of a base station device according to the first embodiment.

FIG. 2 is a schematic block diagram illustrating a configuration of the base station device a1 according to the first embodiment. In FIG. 2, the base station device a1 includes: a system information generator a101; a CSG user information storing unit a102; a controller a103; a receiver a104; a radio transmitter a105; a transmission antenna a106; a reception antenna a111; a ratio receiver a112; an authenticator a113; and a transmitter a114. In addition to the above functions, the base station device a1 has generally known functions of base station devices. With reference to FIG. 2, explanations are given with respect to a case where the base station device a1 is a base station device serving a hybrid cell.

The system information generator a101 generates system information for controlling communication with the mobile station device b1, and outputs the system information to the controller a103.

The system information includes, for example: a cell ID (Physical Cell Identifier) of the base station device a1; a CSG identifier of a cell served by the base station device a1 (for example, "1" in the case of the base station device A2 shown in FIG. 1); and a cell reselection priority for each of predetermined frequencies (referred to as service frequencies). The physical cell identifier is identification information of a cell, and information indicating the cell type. Hereinafter, the cell IDs of the cells C1, C2, and the like shown in FIG. 1 are simply denoted as "C1," "C2," and the like. Additionally, a value of the cell reselection priority is usually set in the range of 0 to 7. As will be explained later, however, a priority determining unit b116 sets, to the cell reselection priority, "8" which is a value higher than the range from which the priority is usually set. As the value of the reselection priority increases, the priority becomes higher. The cell reselection priority may be previously stored, or be obtained from another device through communication.

Additionally, the system information includes control information determined by the controller a103 as will be explained later (for example, information of a time/frequency band).

The CSG user information storing unit a102 stores CSG user information. The CSG user information includes: identification information of users allowed access as a CSG cell (for example, a terminal ID or a user ID); and service type information indicating whether or not to access as a CSG cell. The service type information is information which is received from the mobile station device b1 and is stored in the CSG user information storing unit a102. Additionally, the CSG user information may be received from an upper entity (core network) on the network side. In this case, the CSG user information storing unit a102 obtains, from the core network through the receiver a104, CSG user information of a camping user and stores the CSG user information. The upper entity includes, for example, an HLR (Home Location Register) for the W-CDMA and an HSS (Home Subscriber Server) for the LTE.

The controller a103 controls the radio transmitter a105 and the radio receiver a112 based on the previously-stored information and the system information received from the system information generator a101. Specifically, the controller a103 determines a time/frequency band to be assigned to the mobile station device b1, based on the CSG user information stored by the CSG user information storing unit a102.

Additionally, the controller a103 determines which of connection service of a CSG cell or connection service of a normal cell to provide to the mobile station device b1 to be accessed. Specifically, the controller a103 determines to provide connection service of the CSG cell if the user identification information received from the mobile station device b1 is included in the CSG user information, and the service identification information indicates that access should be performed as the CSG cell.

For example, if it is determined to provide connection service of the CSG cell, the controller a103 assigns, to the mobile station device b1 to which the connection service of the CSG cell is to be provided, more time/frequency bands compared to a mobile station device to which the connection service of the normal cell is to be provided. Further, the controller a103 preferentially assigns a frequency band where the communication rate is high (for example, a high-frequency band), to the mobile station device b1 to which the connection service of the CSG cell is to be provided.

Additionally, the controller a103 outputs, to the radio transmitter a105, the system information received from the system information generator a101 and the authentication result information received from the authenticator a113.

The receiver a104 communicates with another communication device connected through another network, and obtains information to be transmitted to the mobile station device b1.

The radio transmitter a105 generates a signal obtained by modulating the information received from the receiver a104 and the information received from the controller a103. Then, the radio transmitter a105 maps the generated signal to the time/frequency band determined by the controller a103. The radio transmitter a105 upconverts the mapped signal into a radio frequency band signal, and transmits the radio frequency band signal through the transmission antenna a106.

The radio receiver a112 downconverts, into a baseband signal, the signal received through the reception antenna a111. The radio receiver a112 demaps the downconverted signal, and demodulates the demapped signal to generate information (bit sequence). The radio receiver a112 outputs, to the authenticator a113, user identification information included in the generated information. Additionally, the radio receiver a112 outputs, to the system information generator a101 and the controller a103, information to be used for controlling communication, which is included in the generated information. Further, the radio receiver a112 outputs other information to the transmitter a114.

The authenticator a113 determines whether or not the user identification information received from the radio receiver a112 is included in the CSG user information stored by the CSG user information storing unit a102. The authenticator a113 outputs, to the controller a103, authentication result information indicating a result of the determination.

The transmitter a114 transmits the information received from the radio receiver a112 to another communication device connected through another network.

(Regarding Configuration of Mobile Station Device b1)

Figure 3:
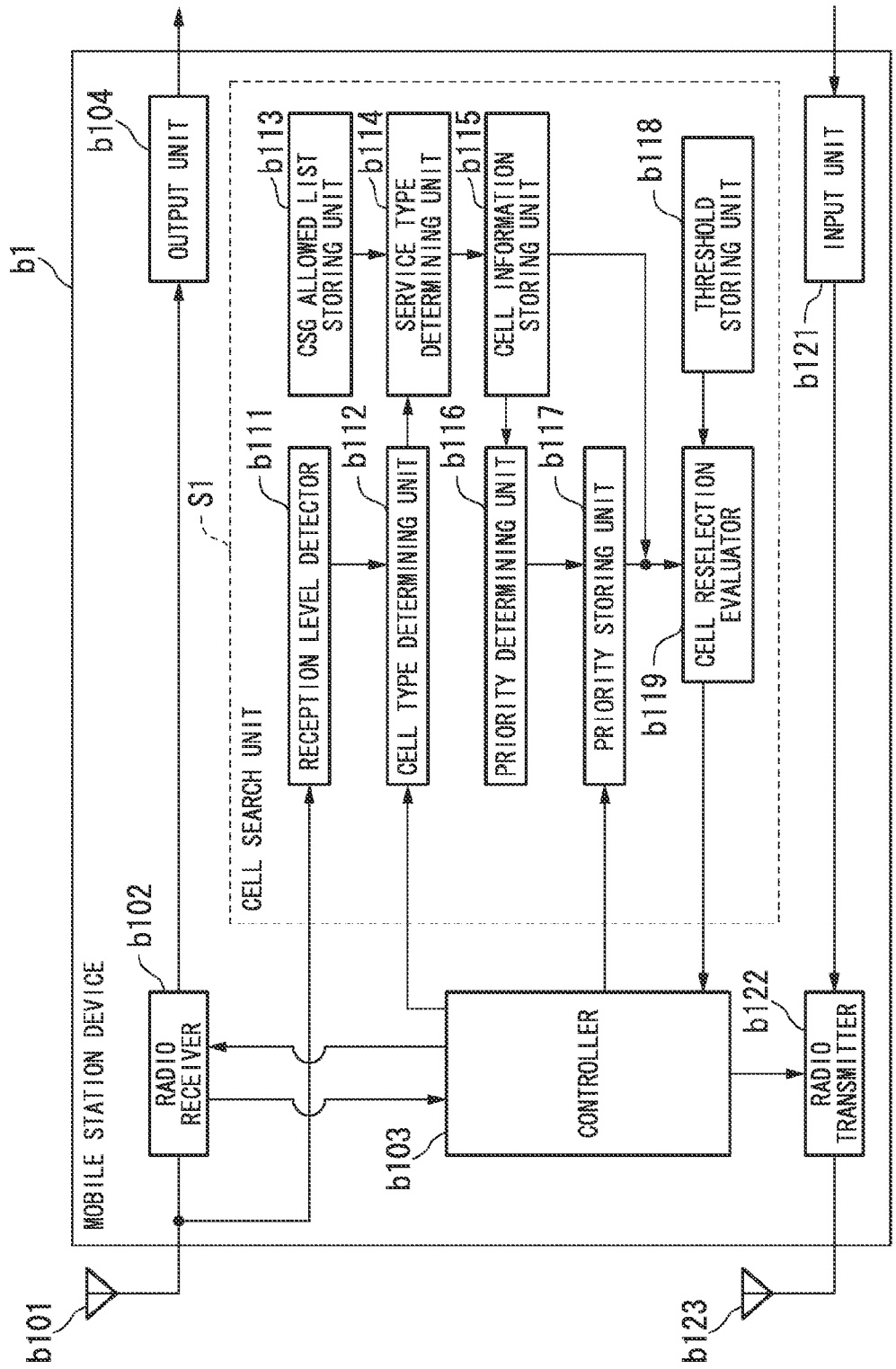
FIG. 3 is a schematic block diagram illustrating a configuration of a mobile station device according to the first embodiment.

FIG. 3 is a schematic block diagram illustrating a configuration of the mobile station device b1 according to the first embodiment. In FIG. 3, the mobile station device b1 includes: a reception antenna b101; a radio receiver b102; a controller b103; an output unit b104; a cell search unit S1; an input unit b121; a radio receiver b122; and a transmission antenna b123. Additionally, the cell search unit S1 includes: a reception level detector b111; a cell type determining unit b112; a CSG allowed list storing unit b113; a service type determining unit b114; a cell information storing unit b115; a priority determining unit b116; a priority storing unit b117; a threshold storing unit b118; and a cell reselection evaluator b119 (selection evaluator). In addition to that above functions, the mobile station device b1 has generally known functions of mobile station devices.

The radio receiver b102 downconverts the signal received through the reception antenna b101 into a baseband signal. The radio receiver b102 demaps the downconverted signal, and demodulates the demapped signal to generate information (bit sequence). The radio receiver b102 outputs system information included in the generated information to the controller b103, and outputs other information to the output unit b104.

The controller b103 controls the radio receiver b102 and the radio transmitter b122 based on the system information received from the radio receiver b102. Specifically, the controller b103 extracts, from the system information, information of a time/frequency band to be used by the mobile station device. Using the band indicated by the extracted information, the controller b103 performs control for transmitting and receiving a radio signal.

Additionally, the controller b103 outputs, to the cell type determining unit b112, the cell ID and the CSG identifier which are extracted from the system information. Further, the controller b103 selects an evaluation type indicating whether or not the mobile station device is camping on a cell having the cell ID. The controller b103 stores, in the priority storing unit b117, the cell reselection priority for each service frequency which is extracted from the system information, as priority information.

Moreover, upon receiving the cell ID from the cell reselection evaluator b119 as will be explained later, the controller b103 performs control for handover to the cell having the cell ID.

The reception level detector b111 detects, for each service frequency, the reception level of a reception signal from each base station device. As the reception level, an RSRP (Reference Signal Received Power) is used. However, the present invention is not limited thereto. For example, pathloss indicating propagation loss, an S value calculated from parameters reported by RSRP and system information, or the like may be used. Here, the reception level detector b111 ranks the reception revels on a scale of 0 to 10 (the greater the value is, the larger the reception power is). The reception level detector b111 outputs, to the cell type determining unit b112, the reception level for each service frequency which is indicated by a rank.

The cell type determining unit b112 selects a cell type based on the cell ID received from the controller b103. The cell type determining unit b112 outputs, to the service type determining unit b114, the information received from the controller b103, the selected cell type, and the reception levels received from the reception level detector b111.

The CSG allowed list storing unit b113 stores a CSG allowed list.

If the cell type received from the cell type determining unit b112 indicates a hybrid cell, the service type determining unit b114 reads a CSG allowed list from the CSG allowed list storing unit b113. The service type determining unit b114 determines whether or not the CSG identifier received from the cell type determining unit b112 is included in the read CSG allowed list. If it is determined that the CSG identifier is included in the CSG allowed list, the service type determining unit b114 determines the service type to be a "CSG cell method." If it is determined that the CSG identifier is not included in the CSG allowed list, the service type determining unit b114 determines the service type to be a "normal cell method." In other words, the CSG allowed list storing unit b113 chooses, based on the identification information received from the base station device a1, which of the connection service of the CSG cell and the connection service of the normal cell to receive from each of the base station devices a1.

The service type determining unit b116 stores, in the cell information storing unit b115, the information received from the cell type determining unit b112, and the determined service type, as cell information. Additionally, the service type is transmitted as service type information to the base station device.

The cell information storing unit b115 stores cell information in which the cell ID, the cell type, the service frequency, the CSG identifier, the service type, and the reception level are associated with one another (see FIG. 5).

The priority determining unit b116 determines, based on the information read from the cell information storing unit b115, whether or not the reception level of a CSG cell or a hybrid cell having the service type of the CSG cell method (hereinafter referred to as a hybrid cell (CSG method)) is the highest with respect to a frequency. If it is determined that the reception level is the highest, the priority determining unit b116 determines a cell reselection priority of a service frequency used by that cell to be the highest value ("8"). In other words, the priority determining unit b116 determines, to be the highest priority, the priority for each frequency band which is used by the base station device a1 from which the service type determining unit b116 chooses to receive the connection service of a CSG cell. Additionally, the priority determining unit b116 determines, to be the priority received from the base station device, a priority for each frequency band which is used by the base station device a1 from which the service type determining unit b116 chooses to receive connection service of a normal cell.

Additionally, the priority determining unit b116 determines, based on the cell information read from the cell information storing unit b115, whether or not the serving cell is a CSG or a hybrid cell (CSG method). If it is determined that the serving cell is a CSG or a hybrid cell (CSG method), the priority determining unit b116 determines, to be the highest value ("8"), a cell reselection priority of the service frequency used by that cell. In other words, the priority determining unit 116 determines, to be the highest priority, a priority for each frequency band used by the base station device a1 which is the connected base station device a1 and from which the connection service of the CSG cell is received.

Based on the determined cell reselection priority, the priority determining unit b116 updates the cell reselection priority included in the priority information stored by the priority storing unit b117.

The threshold storing unit b118 stores predetermined reception level thresholds Th1, Th2, and Th3.

Based on the priority information stored by the priority storing unit b117, the cell reselection evaluator b119 compares the cell reselection priority of a cell to be subjected to cell reselection evaluation (referred to as an evaluating cell) to the cell reselection priority of the cell on which the mobile station device is camping (referred to as a serving cell). As a result of the comparison, the processes for the following cases of (A1) to (A3) are performed.

(A1) If the cell reselection priority of the evaluating cell is higher than the cell reselection priority of the serving cell:

The cell reselection evaluator b119 determines whether or not the reception level of the evaluating cell is kept higher than the threshold Th1 for a predetermined duration ΔT. If it is determined that the reception level of the evaluating cell is higher than the threshold Th1, the cell reselection evaluator b119 outputs the cell ID of the evaluating cell to the controller b103.

(A2) If the cell reselection priority of the evaluating cell is identical to the cell reselection priority of the serving cell:

The cell reselection evaluator b119 determines whether or not the reception level of the evaluating cell is kept higher than the reception level of the serving cell for a predetermined duration ΔT. If it is determined that the reception level of the evaluating cell is higher than the reception level of the serving cell, the cell reselection evaluator b119 outputs the cell ID of the evaluating cell to the controller b103.

(A3) If the cell reselection priority of the evaluating cell is smaller than the cell reselection priority of the serving cell:

The cell reselection evaluator b119 determines whether or not the reception level of the serving cell is kept lower than the threshold Th2 for the predetermined duration ΔT, and the reception level of the evaluating cell is higher than the threshold Th3 for the predetermined duration ΔT. If it is determined that the reception level of the serving cell is lower than the threshold Th2 and the reception level of the evaluating cell is higher than the threshold Th3, the cell reselection evaluator b119 outputs the cell ID of the evaluating cell to the controller b103.

Here, the above process by the cell reselection evaluator b119 is referred to as a cell reselection evaluating process.

(Regarding Information Stored by Mobile Station Device b1)

FIG. 4 is a schematic diagram illustrating an example of a priority information table according to the first embodiment. As shown in FIG. 4, the priority information table shows that a cell reselection priority is stored for each service frequency.

For example, a service frequency "Ch02" shown in FIG. 4 indicates the cell reselection priority "4."

FIG. 5 is a schematic diagram illustrating an example of a cell information table according to the first embodiment. As shown in FIG. 5, the cell information table includes columns for the cell ID, the cell type, the service frequency, the CSG identifier, the service type, and the reception level.

For example, the cell C2 shown in FIG. 5 is a "CSG" cell operated with the service frequency "Ch01," and the service type thereof is "x," which indicates that the cell C2 is a cell which does not allow mobile station devices to access thereto. Additionally, the cell C3 is a "hybrid cell" operated with the service frequency "Ch02," the service type thereof is "CSG" which indicates that the cell C3 is a cell that provides connection service of a CSG cell to mobile station devices.

FIG. 6 is a schematic diagram illustrating another example of a priority information table according to the first embodiment. This drawing shows a priority information table in the state after the priority determining unit b116 has updated the cell reselection priority in the case of the priority information table shown in the example of FIG. 4 and the cell information table shown in the example of FIG. 5. As shown in FIG. 6, the priority information table stores a cell reselection priority for each service frequency.

If FIG. 6 is compared to FIG. 4, the differences are in that the cell reselection priority of the service frequency "Ch02" has been updated from "4" (FIG. 4) to "8" (FIG. 6), and that the cell reselection priority of the service frequency "Ch03" has been updated from "2" (FIG. 4) to "8" (FIG. 6). In other words, FIG. 6 shows that the priority determining unit b116 has determined that the cell C3 having the cell type of "hybrid" and the service type of "CSG" and the cell C4 having the cell type of "CSG" respectively have the highest reception levels with respect to the service frequencies "Ch02" and "Ch03," has determined the cell reselection priorities thereof to be the highest value ("8"), and then has updated the cell reselection priorities in the priority information table based on the determined value.

(Regarding Operations of Mobile Station Device b1)

Figure 7:
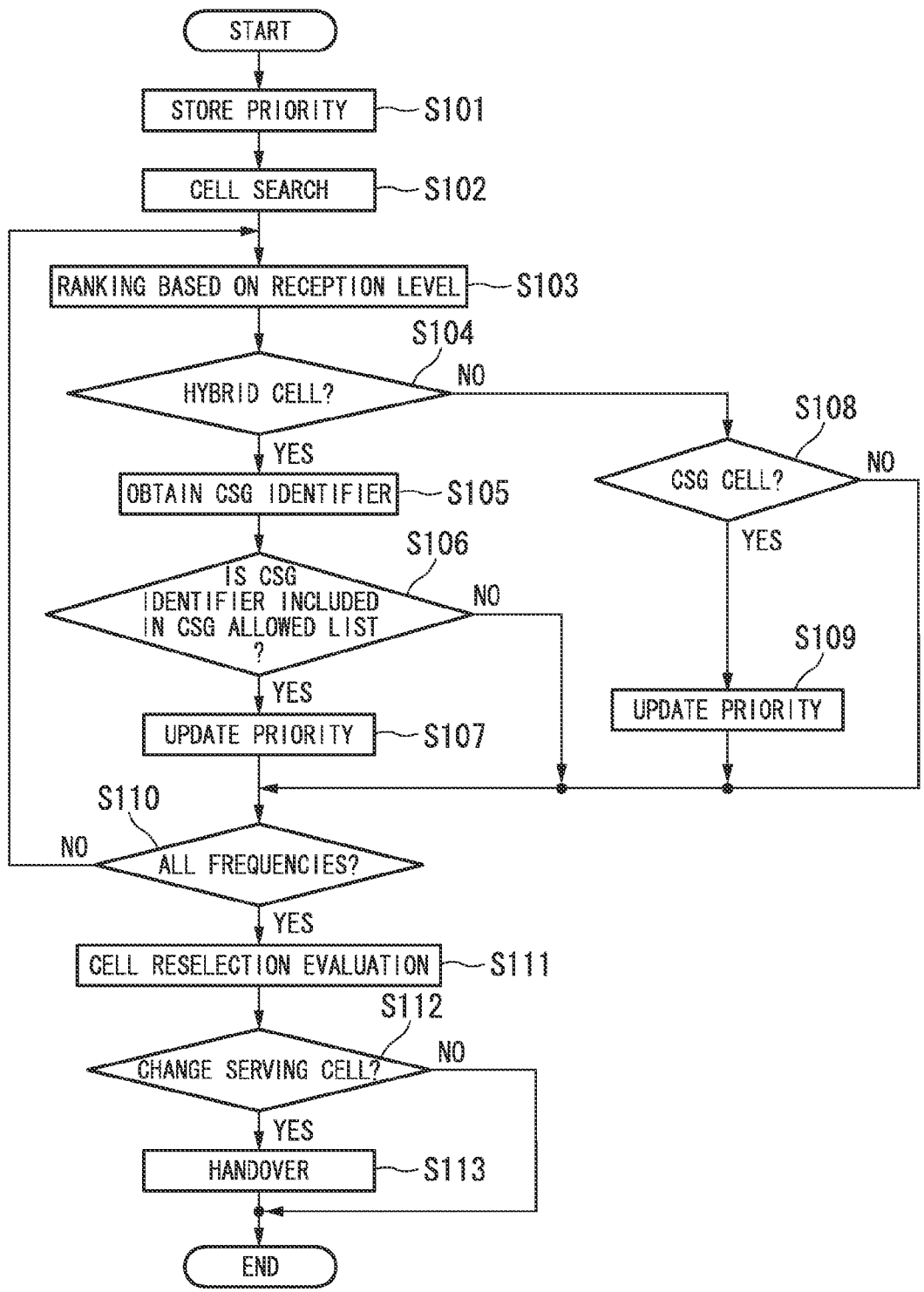
FIG. 7 is a flowchart illustrating operations of the mobile station device according to the first embodiment.

FIG. 7 is a flowchart illustrating operations of the mobile station device b1 according to the first embodiment.

(Step S101) The mobile station device b1 stores, in the priority storing unit b117, the cell reselection priority received from the base station device. Then, the routine proceeds to step S102.

(Step S102) The mobile station device b1 performs cell search according to the reception level of the serving cell. Then, the routine proceeds to step S103.

(Step S103) The mobile station device b1 measures the reception levels of the cells detected in step S102 and ranks, for each service frequency, the cells in order according to the reception level. Then, the routine proceeds to step S104.

(Step S104) The mobile station device b1 selects the cell type by referring to the cell ID of the cell ranked at the top for each service frequency, and determines whether or not the selected cell type is a hybrid cell. If it is determined that the selected cell type is the hybrid cell (Yes), the routine proceeds to step S105. If it is determined that the selected cell type is not the hybrid cell (No), the routine proceeds to step S108.

Although it has been explained here that the cell type of only the cell ranked at the top for each service frequency is determined, the cell types of all the detected cells may be determined.

(Step S105) The mobile station device b1 receives system information from the base station device a1, and obtains a CSG identifier. Then, the routine proceeds to step S106.

(Step S106) The mobile station device b1 determines whether or not the CSG identifier obtained in step S105 is included in the CSG allowed list. If it is determined that the CSG identifier is included in the CSG allowed list (Yes), the routine proceeds to step S107. On the other hand, if it is determined that the CSG identifier is not included in the CSG allowed list (No), the routine proceeds to step S110.

(Step S107) The mobile station device b1 updates, to the highest value, the cell reselection priority of the cell whose CSG identifier is determined in step S106 to be included in the CSG allowed list. Then, the routine proceeds to step S110.

(Step S108) The mobile station device b1 determines whether or not the cell type selected in step S104 is the CSG cell. If it is determined that the selected cell type is the CSG cell (Yes), the routine proceeds to step S109. On the other hand, if it is determined that the selected cell type is not the CSG cell (No), the routine proceeds to step S110.

(Step S109) The mobile station device b1 updates, to the highest value, the cell reselection priority of the cell whose cell type is determined in step S108 to be the CSG cell. Then, the routine proceeds to Step S110.

(Step S110) The mobile station device b1 determines whether or not the processes from steps S103 to S109 are completed for service frequencies of all the cells detected by the cell search in step S102. If it is determined that the processes are completed for all the service frequencies (Yes), the routine proceeds to step S111. On the other hand, if it is determined that the processes are not completed for all the service frequencies (No), the routine returns to step S103.

(Step S111) The mobile station device b1 performs cell reselection evaluation. Thereafter, the routine proceeds to step S111.

(Step S112) The mobile station device b1 determines, based on the result of the process in step S111, whether or not to change the serving cell to the evaluating cell. If it is determined to change the serving cell (Yes), the routine proceeds to step S113. On the other hand, if it is determined not to change the serving cell (No), the operations end.

(Step S113) The mobile station device b1 performs a handover to the evaluating cell to which it is determined in step S112 to change the serving cell. Then, the operations end.

According to the first embodiment, the mobile station device b1 stores, for each of the predetermined frequency bands (ChN), priorities for accessing the base station devices using the frequency bands. Based on the CSG identifiers received from the base station devices a1, the mobile station device b1 chooses which of the connection service of a CSG cell and the connection service of a normal cell to receive from each of the base station devices a1. Additionally, the mobile station device b1 determines, based on the selected service type, priorities for the respective frequency bands used by the base station devices a1. Then, the mobile station device b1 updates the stored priorities based on the determined priorities. Based on the updated priorities and the reception levels of the reception signals for each frequency band which are received from the respective base station devices, the mobile station device b1 selects a base station device to access. Thereby, the mobile station device b1 can evaluate a cell providing multiple connection services with different service qualities, and access a base station device serving a cell providing high quality service.

Additionally, according to the first embodiment, the mobile station device b1 determines, to be the highest priority, a priority for each frequency band used by the base station device a1 from which the mobile station device b1 chooses to receive connection service of the CSG cell. Thereby, the mobile station device b1 can preferentially select a hybrid cell from which to receive connection service of the CSG cell.

(Second Embodiment)

Hereinafter, a second embodiment of the present invention is explained in detail with reference to the drawings.

It has been explained in the first embodiment that the mobile station device b1 updates the cell reselection priorities of the CSG cell and the hybrid cell (CSG cell method), and preferentially accesses these cells. Since a mobile station device can access the hybrid cell while regarding the hybrid cell as a normal cell, service quality decreases in some cases if the number of camping mobile station devices increases. For example, in the hybrid cell, if the number of mobile station devices that access the hybrid cell as a normal cell increases, the number of time/frequency bands to be assigned to mobile station devices that access the hybrid cell by the CSG cell method decreases, thereby causing a decrease in communication rate in some cases. In this case, a merit of accessing that cell by the CSG cell method decreases. In other words, even if the cell is a hybrid cell that is accessible by the CSG cell method, the merit of prioritizing the CSG cell method to access the hybrid cell decreases.

In the second embodiment, explanations are given with respect to a case where a base station device transmits priority control information indicating whether or not to update the cell reselection priorities, and a mobile station device updates the cell reselection priorities based on the priority control information.

The schematic diagram illustrating the communication system according to the second embodiment is the same as FIG. 1, and therefore explanations thereof are omitted here. Hereinafter, the base station device and the mobile station device according to the second embodiment are referred to as a base station device a2 and a mobile station device b2, respectively.

(Regarding Configuration of Base Station Device a2)

Figure 8:
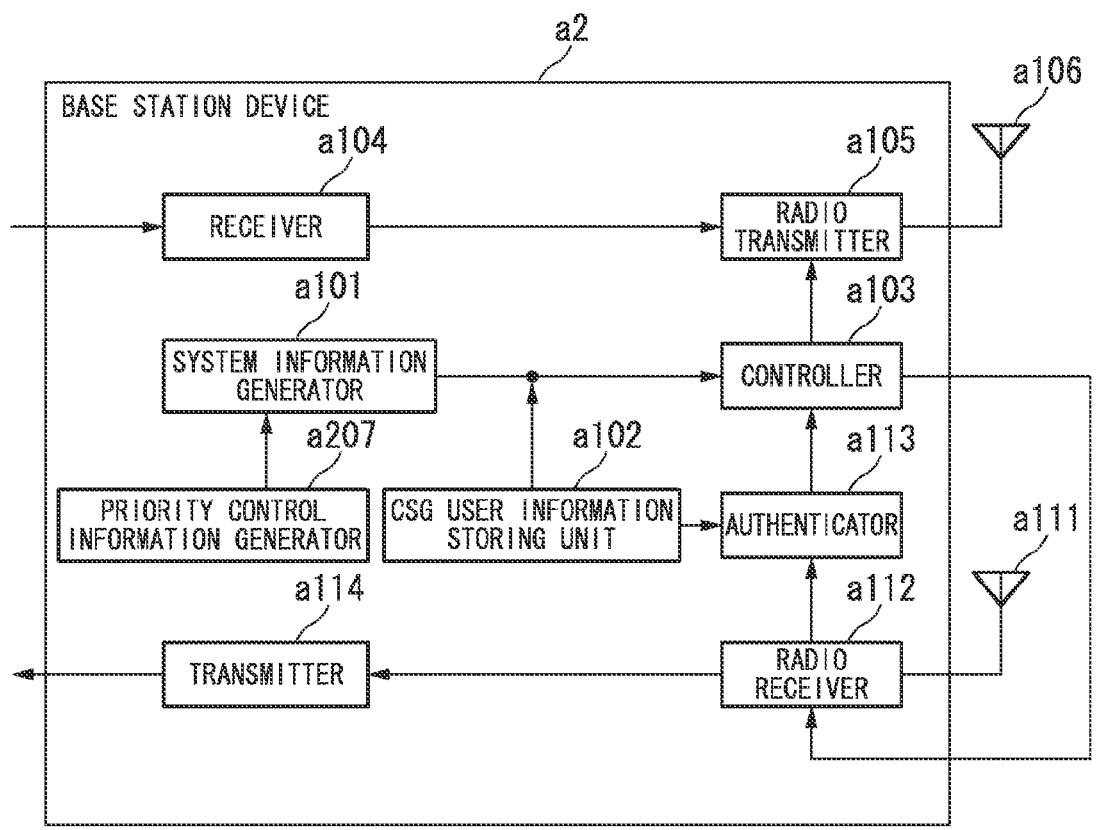
FIG. 8 is a schematic block diagram illustrating a configuration of a base station device according to a second embodiment of the present invention.

FIG. 8 is a schematic block diagram illustrating a configuration of the base station device a2 according to the second embodiment of the present invention. If the base station device a2 according to the second embodiment (FIG. 8) is compared to the base station device a1 according to the first embodiment (FIG. 2), a priority control information generator a207 differs. However, functions of other constituent elements (the system information generator a101, the CSG user information storing unit a102, the controller a103, the receiver a103, the radio transmitter a105, the transmission antenna a106, the reception antenna a111, the radio receiver a112, the authenticator a113, and the transmitter a114) are the same as those of the first embodiment. Explanations of the functions which are the same as those of the first embodiment are omitted here.

The priority control information generator a207 generates priority control information indicating whether or not to update the cell reselection priorities. If the number of mobile station devices camping on the cell served by the base station device a2 (referred to as the serving number) is equal to or greater than a predetermined threshold, the priority control information indicates that the cell reselection priorities are not to be updated. If the serving number is smaller than the predetermined threshold, the priority control information indicates that the cell reselection priorities are to be updated. However, the present invention is not limited thereto. Instead, for example, if the band assigned to the mobile station device is equal to or greater than a predetermined threshold, or if the time is a heavy communication traffic time, the priority control information may indicate that the cell reselection priorities are not to be updated. If these values are smaller than the threshold, the priority control information may indicate that the cell reselection priorities are to be updated.

The priority control information generator a207 outputs the generated priority control information to the system information generator a101. The priority control information is transmitted as system information to the mobile station device b2.

(Regarding Configuration of Mobile Station Device b2)

Figure 9:
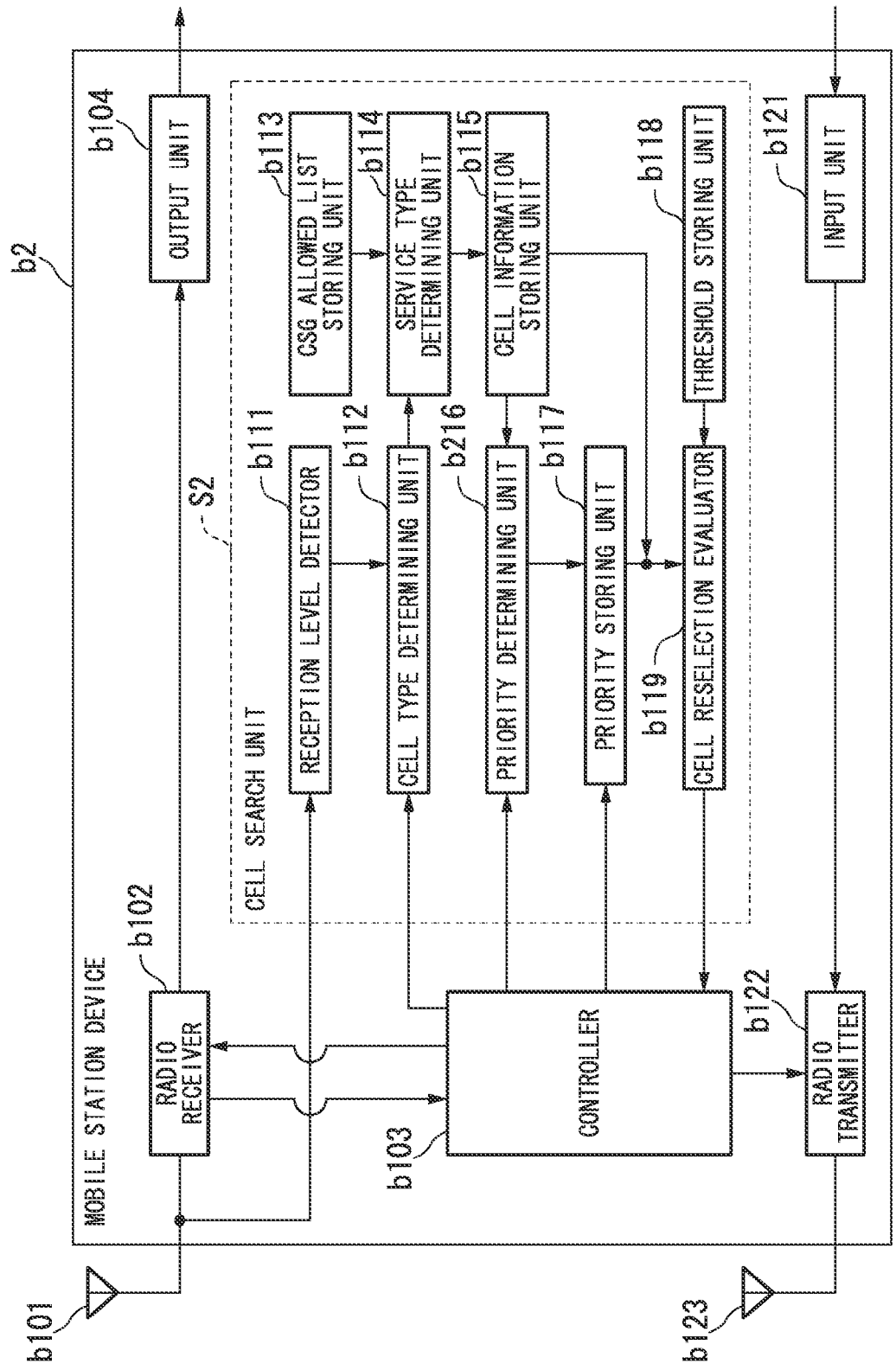
FIG. 9 is a schematic block diagram illustrating a configuration of a mobile station device according to the second embodiment.

FIG. 9 is a schematic block diagram illustrating a configuration of the mobile station device b2 according to the second embodiment. If the mobile station device b2 according to the second embodiment (FIG. 9) is compared to the mobile station device b1 according to the first embodiment (FIG. 3), a priority determining unit b216 differs. However, functions of other constituent elements (the reception antenna b101, the radio receiver b102, the controller b103, the output unit b104, the input unit b121, the radio receiver b122, the transmission antenna b123, the reception level detector b111, the cell type determining unit b112, the CSG allowed list storing unit b113, the service type determining unit b114, the cell information storing unit b115, the priority storing unit b117, the threshold storing unit b118, and the cell reselection evaluator b119) are the same as those of the first embodiment. Explanations of the functions which are the same as those of the first embodiment are omitted here.

The priority determining unit b216 extracts priority control information from the system information received from the controller b103. Based on the extracted priority control information, the priority determining unit b216 performs processes for the following cases of (B1) and (B2).

(B1) If the priority control information indicates that the sell reselection priorities are not to be updated:

Based on the cell information read from the cell information storing unit b115, the priority determining unit b216 determines whether or not the reception level of the CSG cell is the highest with respect to a frequency. If it is determined that the reception level is the highest, the priority determining unit b216 determines, to be the highest value ("8"), a cell reselection priority of the service frequency used by that cell.

Additionally, based on the cell information read from the cell information storing unit b115, the priority determining unit b216 determines whether or not the serving cell is the CSG. If it is determined that the serving cell is the CSG, the priority determining unit b216 determines, to be the highest value ("8"), a cell reselection priority of the service frequency used by that cell.

(B2) If the priority control information indicates that the sell reselection priorities are to be updated:

Based on the cell information read from the cell information storing unit b115, the priority determining unit b216 determines whether or not the reception level of a CSG cell or a hybrid cell (CSG method) is the highest with respect to a frequency. If it is determined that the reception level is the highest, the priority determining unit b216 determines, to be the highest value ("8"), a cell reselection priority of the service frequency used by that cell.

Additionally, based on the cell information read from the cell information storing unit b115, the priority determining unit b216 determines whether or not the serving cell is the CSG or the hybrid cell (CSG method). If it is determined that the serving cell is the CSG or the hybrid cell (CSG method), the priority determining unit b216 determines, to be the highest value ("8"), a cell reselection priority of the service frequency used by that cell.

As a result of the process for the above case of (B1) or (B1), the priority determining unit b216 updates the cell reselection priorities stored by the priority storing unit b117 based on the determined cell reselection priorities.

(Regarding Information Stored by Mobile Station Device b2)

FIG. 10 is a schematic diagram illustrating an example of a priority information table according to the second embodiment. This drawing shows the priority information table in the state after the priority determining unit b216 has performed the process for the above case of (B1) (the process when the priority control information indicates that the cell reselection priorities are not to be updated) in the case of the cell information shown in the example of FIG. 4 and the cell information table shown in the example of FIG. 5. The priority information table in the state after the priority determining unit b216 has performed the process for the above case of (B2) (the process when the priority control information indicates that the cell reselection priorities are to be updated) in the case of the cell information shown in the example of FIG. 4 and the cell information table shown in the example of FIG. 5 is the same as shown in FIG. 6.

If FIG. 10 is compared to FIG. 6, the cell reselection priorities differ in that the priorities of the service frequency Ch02 are "4" (FIG. 10) and "8" (FIG. 6). FIG. 10 shows that if the priority determining unit b216 performs the process for the above case of (B1), only the priority of the service frequency Ch03 is updated, and the priority of the service frequency Ch02 is not updated.

(Regarding Operations of Mobile Station Device b2)

Figure 11:
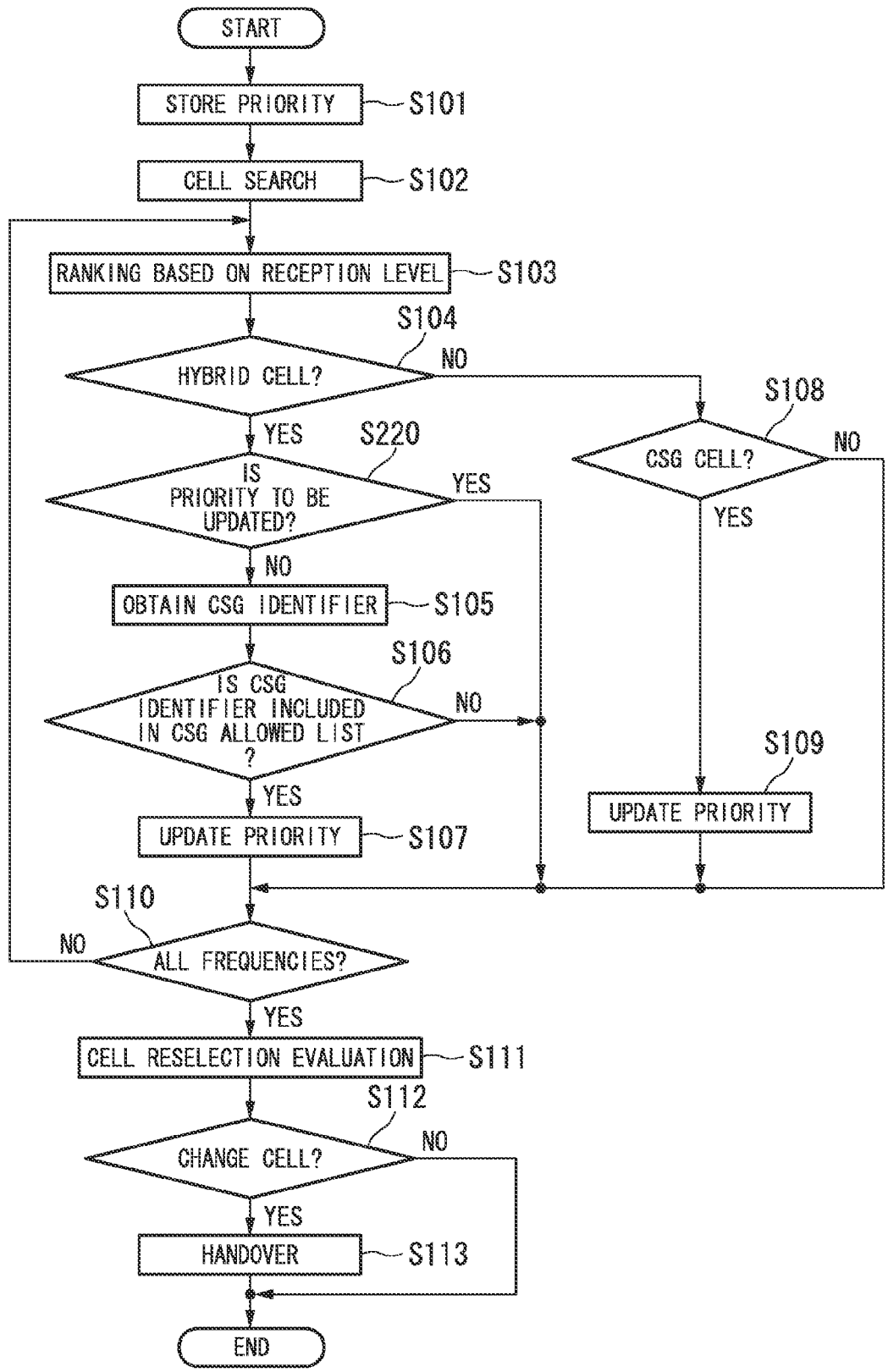
FIG. 11 is a flowchart illustrating operations of the mobile station device according to the second embodiment.

FIG. 11 is a flowchart illustrating operations of the mobile station device b2 according to the second embodiment. If the operations of the mobile station device b2 according to the second embodiment (FIG. 11) are compared to the operations of the mobile station device b1 according to the first embodiment (FIG. 7), a process in step S220 differs. However, other processes (steps S101 to S113) are the same as those of the first embodiment. Explanations of the processes which are the same as those of the first embodiment are omitted here.

(Step S220) The mobile station device b2 determines whether or not the priority control information indicates that the cell reselection priorities are not to be updated. If the priority control information indicates that the cell reselection priorities are not to be updated (Yes), the routine proceeds to step S110. On the other hand, if the priority control information indicates that the cell reselection priorities are to be updated (No), the routine proceeds to step S105.

As explained above, according to the second embodiment, the base station device a2 generates priority control information which indicates whether or not the mobile station device b2 is to update the priorities and which is to be transmitted to the mobile station device b2. Additionally, the mobile station device b2 updates the priorities if the priority control information indicates that the priorities are to be updated. The mobile station device b2 does not update the priorities if the priority control information indicates that the priorities are not to be updated. Thereby, if a hybrid cell can be accessed by the CSG method, but there is little merit of prioritizing the hybrid cell method to access the hybrid cell, the mobile station device b2 can avoid preferentially accessing the hybrid cell.

(Third Embodiment)

Hereinafter, a third embodiment of the present invention is explained in detail with reference to the drawings.

A mobile station device can access a hybrid cell while regarding the hybrid cell as a normal cell. For this reason, service quality of the hybrid cell decreases compared to the CSG cell in some cases. For example, in a hybrid cell, if time/frequency bands are assigned to mobile station devices that access the hybrid cell as a normal cell, time/frequency bands to be assigned to mobile station devices that access the hybrid cell by the CSG cell method decrease, thereby causing a decrease in the communication rate compared to the CSG cell in some cases.

In the third embodiment, explanations are given with respect to a case where a mobile station device prioritizes access to a CSG cell over access to a hybrid cell (CSG cell method). As will be explained later, the priority determining unit b316 sets, to the cell reselection priority, "8" or "9" which is a higher value than the range ("0" to "7") in which the cell reselection priority is usually set.

(Regarding Communication System)

Figure 12:
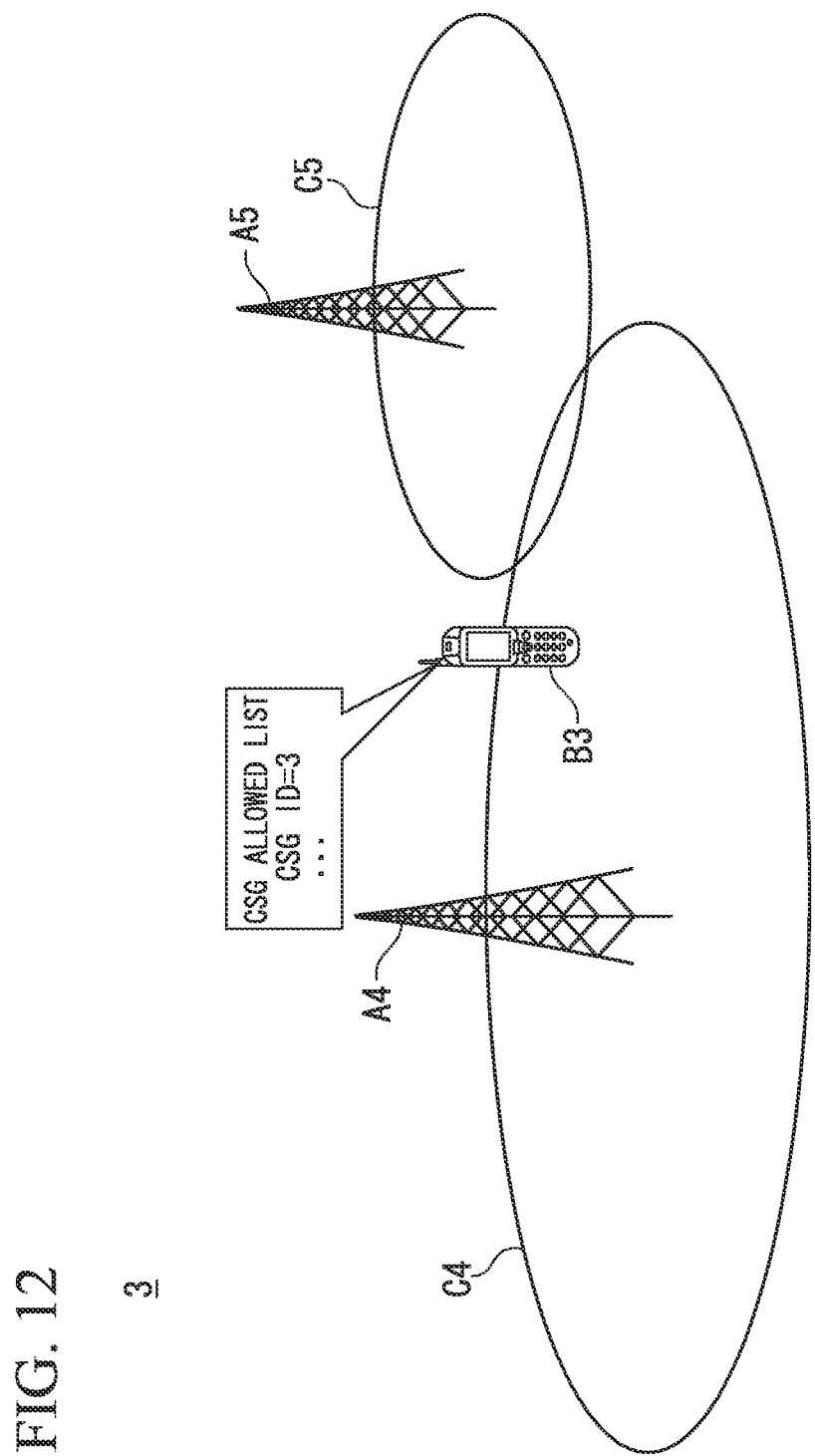
FIG. 12 is a schematic diagram illustrating a communication system according to a third embodiment of the present invention.

FIG. 12 is a schematic diagram illustrating a communication system 3 according to a third embodiment of the present invention. In FIG. 12, cells C4 and C5 denote communication areas of base station devices A4 and A5, respectively. Additionally, this drawing shows that the cell types of the cells C4 and C5 are a hybrid cell and a CSG cell, respectively, and that a CSG identifier of the cell C4 is "3."

Additionally, in FIG. 12, a mobile station device B3 is camping on cell C4. This drawing shows that the mobile station device B3 previously stores an allowed CSG list, and that the CSG identifier "3" of the cell C4 is included in the allowed CSG list.

Hereinafter, explanations are given while the mobile station device B3 is regarded as a mobile station device b3. The configuration of the base station device A4 is the same as that of the base station device a1 of the first embodiment, and therefore explanations thereof are omitted here.

(Regarding Configuration of Mobile Station Device b3)

Figure 13:
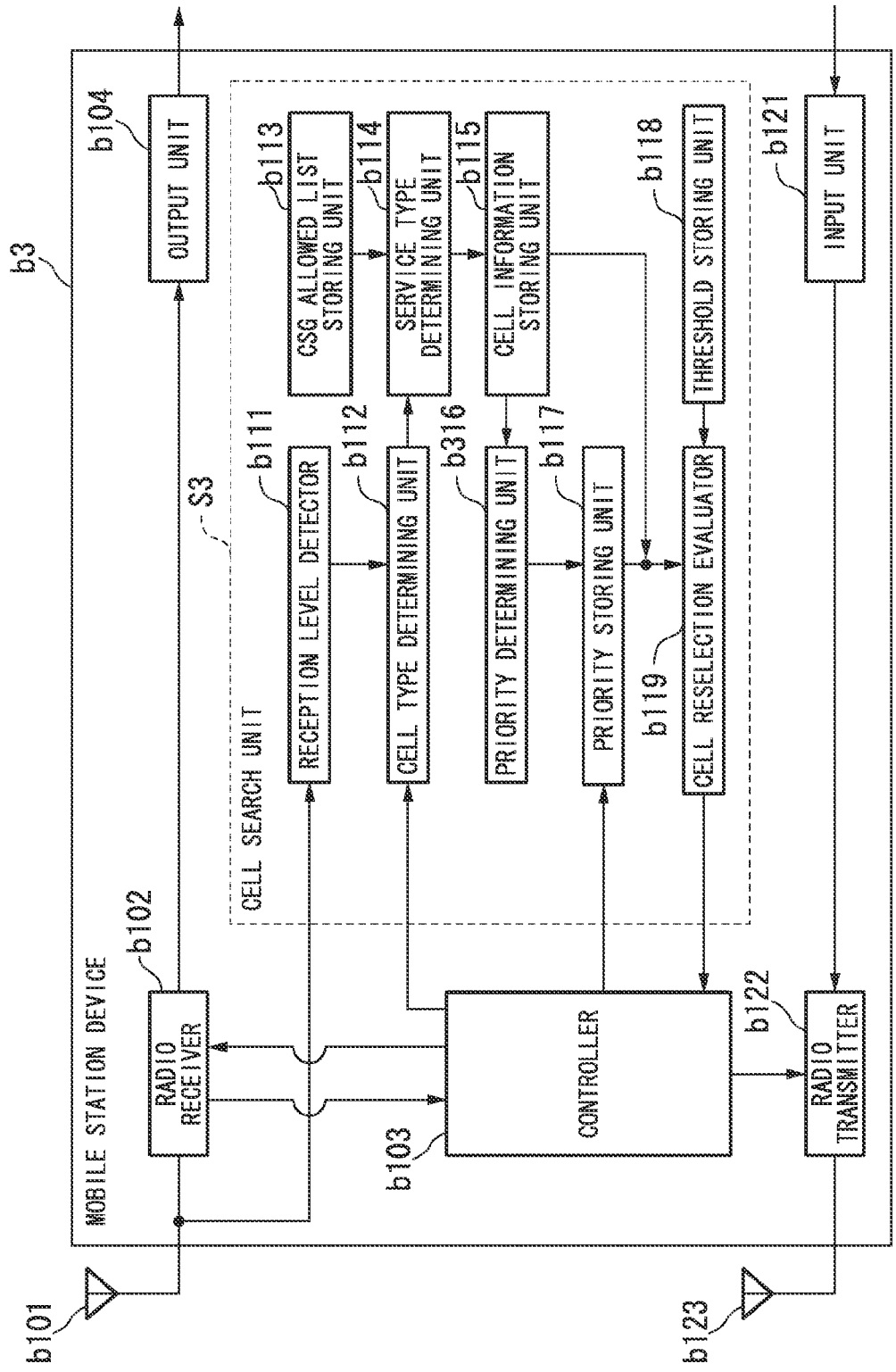
FIG. 13 is a schematic block diagram illustrating a configuration of a mobile station device according to the third embodiment.

FIG. 13 is a schematic block diagram illustrating a configuration of the mobile station device b3 according to the third embodiment. If the mobile station device b3 according to the third embodiment (FIG. 13) is compared to the mobile station device b1 according to the first embodiment (FIG. 3), a priority determining unit b316 differs. However, functions of other constituent elements (the reception antenna b101, the radio receiver b102, the controller b103, the output unit b104, the input unit b121, the radio receiver b122, the transmission antenna b123, the reception level detector b111, the cell type determining unit b112, the CSG allowed list storing unit b113, the service type determining unit b114, the cell information storing unit b115, the priority storing unit b117, the threshold storing unit b118, and the cell reselection evaluator b119) are the same as those of the first embodiment. Explanations of the functions which are the same as those of the first embodiment are omitted here.

Based on the cell information read from the cell information storing unit b115, the priority determining unit b316 determines whether or not the reception level of a CSG cell or a hybrid cell (CSG method) is the highest with respect to a frequency. If it is determined that the reception level of the CSG cell is the highest with respect to the frequency, the priority determining unit 316 sets the highest value ("9") to the cell reselection priority of the service frequency used by the CSG cell. If it is determined that the reception level of the hybrid cell (CSG method) is the highest with respect to the frequency, the priority determining unit 316 sets the highest value ("8") to the cell reselection priority of the service frequency used by the hybrid cell (CSG method).

In the third embodiment, "9" and "8" are set to the cell reselection priorities of the CSG cell and the hybrid cell (CSG method) whose reception levels are the highest with respect to the frequencies, respectively. However, the present invention is not limited thereto as long as the cell reselection priority of the CSG cell is greater in value than the cell reselection priority of the hybrid cell (CSG method).

Based on the cell information read from the cell information storing unit b115, the priority determining unit b316 determines whether or not the serving cell is the CSG cell or the hybrid cell (CSG method). If it is determined that the serving cell is the CSG cell, the priority determining unit b316 determines, to be the highest value ("9"), the cell reselection priority of the service frequency used by that cell. On the other hand, if it is determined that the serving cell is the hybrid cell (CSG method), the priority determining unit b316 determines, to be the second highest value ("8"), the cell reselection priority of the service frequency used by that cell.

The priority determining unit b316 updates the cell reselection priority included in the priority information stored in the priority storing unit b117 based on the determined cell reselection priority.

(Regarding Information Stored by Mobile Station Device b3)

FIG. 14 is a schematic diagram illustrating an example of a priority information table according to the third embodiment. As shown in FIG. 14, the priority information table shows that a cell reselection priority is stored for each service frequency.

For example, a service frequency "Ch04" shown in FIG. 14 indicates the cell reselection priority "5."

FIG. 5 is a schematic diagram illustrating an example of a cell information table according to the first embodiment. As shown in FIG. 15, the cell information table includes columns for the cell ID, the cell type, the service frequency, the CSG identifier, the service type, and the reception level.

For example, the cell C7 shown in FIG. 15 indicates a "hybrid" cell which is operated with the service frequency "Ch04," and which provides connection service of the CSG cell to mobile station devices. Additionally, the cell C9 indicates a "CSG" cell operated with the service frequency "Ch05."

FIG. 16 is a schematic diagram illustrating another example of a priority information table according to the first embodiment. This drawing shows a priority information table in the state after the priority determining unit b316 has updated the cell reselection priority in the case of the priority information table shown in the example of FIG. 14 and the cell information table shown in the example of FIG. 15. As shown in FIG. 16, the priority information table stores a cell reselection priority for each service frequency.

If FIG. 16 is compared to FIG. 14, the differences are in that the cell reselection priority of the service frequency "Ch04" has been updated from "5" (FIG. 14) to "8" (FIG. 16), and that the cell reselection priority of the service frequency "Ch05" has been updated from "4" (FIG. 14) to "9" (FIG. 16). In other words, FIG. 16 shows that the priority determining unit b316 has determined that the cell C9 having the cell type "CSG" has the highest reception level with respect to the service frequency "Ch05," and has determined the cell reselection priority thereof to be the highest value ("9"). FIG. 16 further shows that the priority determining unit b316 has determined that the cell C7 having the cell type "hybrid" and the service type "CSG" has the highest reception level with respect to the service frequency "Ch04," has determined the cell reselection priority thereof to be the second highest value ("8"), and then has updated the cell reselection priority based on the determined value.

For simplification of the explanations, it has been explained that the cell reselection priority "Ch04" is updated from "5" to "8." However, the priority of the service frequency "Ch04" may be updated to "8" at the time the mobile station device camps on the cell C7.

(Regarding Operations of Mobile Station Device b3)

Figure 17:
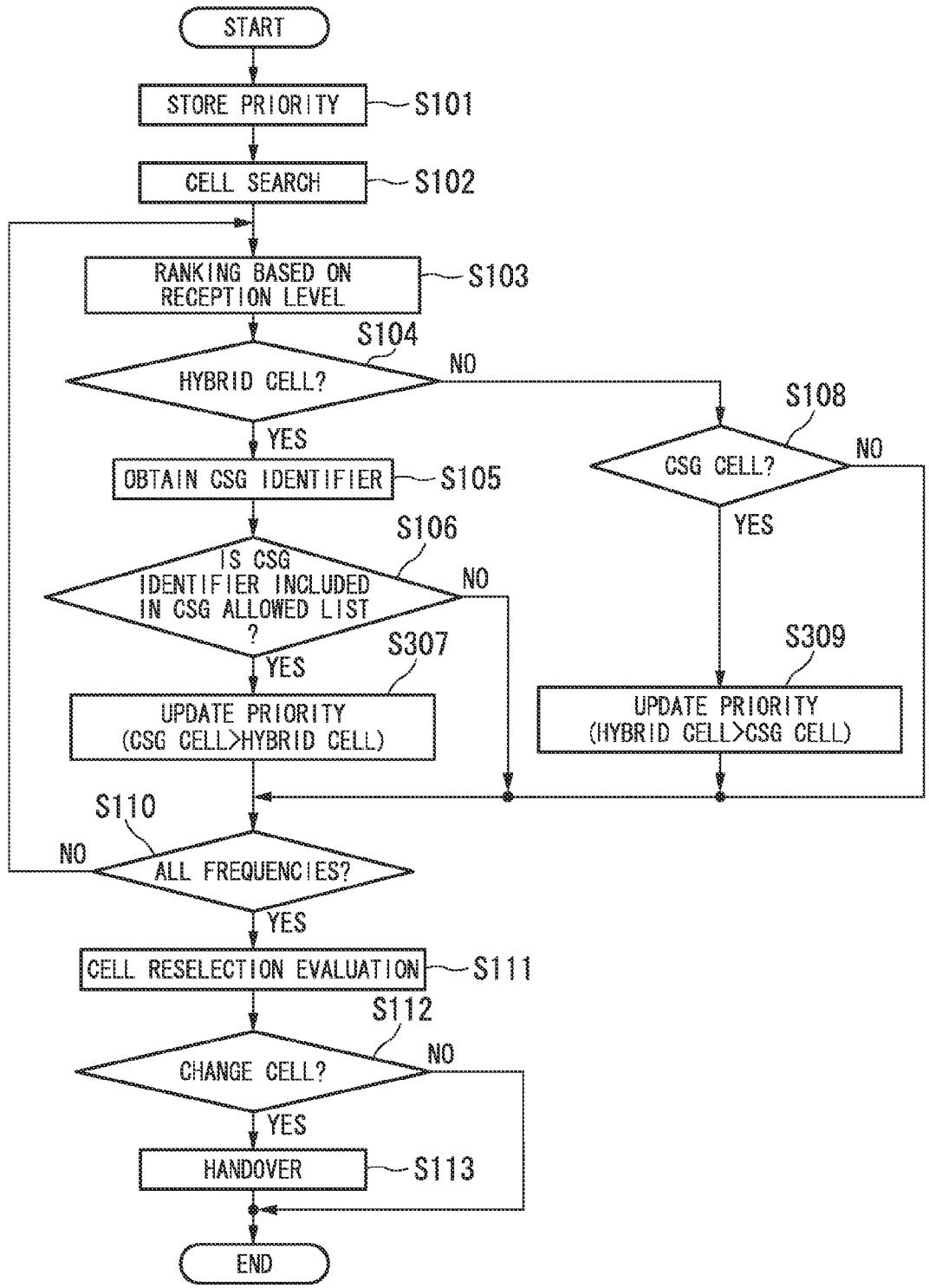
FIG. 17 is a flowchart illustrating operations of the mobile station device according to the third embodiment.

FIG. 17 is a flowchart illustrating operations of the mobile station device b3 according to the third embodiment. If the operations of the mobile station device b3 according to the third embodiment (FIG. 17) are compared to the operations of the mobile station device b1 according to the first embodiment (FIG. 7), processes in steps S307 and S309 differ. However, other processes (steps S101 to S106, S108, and S110 to S113) are the same as those of the first embodiment. Explanations of the same processes as those of the first embodiment are omitted here.

(Step S307) The mobile station device b3 updates, to "8," the cell reselection priority of the cell whose CSG identifier is determined in step S106 to be included in the CSG allowed list. In other words, the mobile station device b3 updates the cell reselection priority to a smaller value than the cell reselection priority "9" of the CSG cell which is updated in step S309.

(Step S309) The mobile station device b3 updates, to the highest value "9," the cell reselection priority of the cell whose cell type is determined in step S108 to be the CSG cell. In other words, the mobile station device b3 updates the cell reselection priority to a greater value than the cell reselection priority "8" of the hybrid cell (CSG cell method) which is updated in step S307. Thereafter, the routine proceeds to step S110.

According to the third embodiment, the mobile station device b3 determines a priority for each frequency band used by the connected base station device A4 from which the connection service of the CSG cell is received to be a priority lower than the priority to be used if the base station device A5 serving the CSG cell has the highest reception level with respect to that service frequency. Thereby, the mobile station device b3 prioritizes the CSG cell with high service quality over a serving hybrid cell to evaluate. In other words, the mobile station device b3 can perform the process in the case of (A1) of the first embodiment. Thereby, the mobile station device b3 can preferentially access the CSG cell with higher service quality than that of the hybrid cell.

Modified Example

In the third embodiment, the cell reselection priority of the CSG cell is set to be greater in value than the cell reselection priority of the hybrid cell (CSG method). Regarding a mobile station device b3 according to the present modified example, the cell reselection priority of the CSG cell is set to be the same in value as the cell reselection priority of the hybrid cell (CSG method). In this case, the cell reselection evaluator b119 performs the process in the case of (A2) of the first embodiment. Therefore, the mobile station device b3 according to the present modified example can compare the reception level of an evaluating cell and the reception level of a serving cell and select a cell to access.

Figure 18:
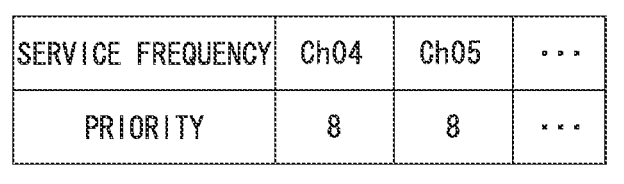

FIG. 18 is a schematic diagram illustrating an example of a priority information table according to the present modified example of the third embodiment. This drawing shows a priority information table in the state after the mobile station device b3 according to the present modified example has updated the cell reselection priority in the case of the priority information table shown in the example of FIG. 14 and the cell information table shown in the example of FIG. 15. Here, regarding the cell C7, the cell type is "hybrid" and the service type is "CSG." Regarding the cell C9, the cell type is "CSG." As shown in FIG. 18, the priority information table stores a cell reselection priority for each service frequency.

If FIG. 18 is compared to FIG. 14, the differences are in that the cell reselection priority of the service frequency "Ch04" has been updated from "5" (FIG. 14) to "8" (FIG. 18), and that the cell reselection priority of the service frequency "Ch05" has been updated from "4" (FIG. 14) to "8" (FIG. 18). In other words, FIG. 18 shows that the mobile station device b3 according to the present modified example has determined, to be the same value ("8"), the cell reselection priority of the cell C9 having the cell type "CSG" and the cell reselection priority of the cell C7 having the cell type "hybrid" and the service type "CSG."

In the third embodiment, the mobile station device b3 may set the cell reselection priority of the serving cell to be lower in value than the cell reselection priority of the evaluating cell only if the serving cell is a hybrid cell (CSG method) and the evaluating cell is a CSG cell.

In each of the above embodiments, the priority determining units b116, b216, and b316 set, to the cell reselection priority, a value ("8" or "9") higher than the range ("0" to "7") in which the priority is usually set. Thereby, the mobile station devices b1 to b3 prioritize cell reselection evaluation in order of the cell reselection priorities updated by the priority determining units b116, b216, and b316 over cell reselection evaluation in order of the normal cell reselection priorities (for LTE).

A computer may implement part of the base station devices a1 and a2, and the mobile station devices b1, b2, and b3, such as: the system information generator a101; the controller a103; the radio transmitter a105; the radio receiver a112; the authenticator a113; the radio receiver b102; the controller b103; the radio receiver b122; the reception level detector b111; the cell type determining unit b112; the service type determining unit b114; the priority determining unit b116, b216, and b316; the cell reselection evaluator b119; and the priority control information generator a207. In this case, a computer readable recording medium may record a program for implementing the control functions, so that a computer system reads and executes the program recorded in the recording medium to implement the control functions. Here, the "computer system" is a computer system built in each of the base station devices a1 and a2, and the mobile station devices b1, b2, and b3. The "computer system" includes OS and hardware, such as a peripheral device. Further, the "computer readable recording medium" includes a portable medium such as a flexible disc, a magneto-optical disc, a ROM, and a CD-ROM, and a storage device such as a hard disk built in the computer system. Moreover, the "computer readable recording medium" may include a medium that dynamically stores a program for a short period of time, such as a communication line used when a program is transmitted via a network such as the Internet or a communication line such as a telephone line. Additionally, the "computer readable recording medium" may include a medium that stores a program for a predetermined period of time, such as a volatile memory built in a computer system serving as a server or client when the program is transmitted via a network such as the Internet or a communication line such as a telephone line. Further, the program may be a program for implementing part of the aforementioned functions. Further, the program may be a program that can implement the aforementioned functions in combination with a program already recorded on the computer system.

Although embodiments of the present invention have been explained above, specific configurations are not limited thereto, and various design modifications may be made without departing from the scope of the present invention.

INDUSTRIAL APPLICABILITY

The present invention is suited to be used for a communication system, a mobile station device, and a base station device, and enables access to a base station device serving a cell providing high quality service.

DESCRIPTION OF REFERENCE NUMERALS a101: system information generator
a102: CSG user information storing unit
a103: controller
a104: receiver
a105: radio transmitter
a106: transmission antenna
a111: reception antenna
a112: radio receiver
a113: authenticator
a114: transmitter
b101: reception antenna
b102: radio receiver
b103: controller
b104: output unit
S1: cell search unit
b121: input unit
b122: radio receiver
b123: transmission antenna
b111: reception level detector
b112: cell type determining unit
b113: CSG allowed list storing unit
b114: service type determining unit
b115: cell information storing unit
b116, b216, and b316: priority determining unit
b117: priority storing unit
b118: threshold storing unit
b119: cell reselection evaluator (selection evaluator)
a207: priority control information generator

The invention claimed is:

1. A communication system comprising:
a plurality of base station devices including at least one first base station device configured to provide one of first and second connection services to a mobile station device, the second connection service being lower in service quality than the first connection service; and
a mobile station device configured to communicate with the base station devices,
wherein the mobile station device comprises:
a priority storing unit configured to store, for each of frequency bands predetermined, a priority for accessing a base station device using one of the associated frequency bands;
a service type determining unit configured to choose, based on identification information received from the at least one first base station device, which of the first and second connection services to receive from each of the at least one first base station device;
a priority determining unit configured to determine, based on a type of a connection service chosen by the service type determining unit, a priority for each of the frequency bands which is used by the at least one first base station device, and to update the priority stored by the priority storing unit based on the priority determined; and
a selection evaluator configured to select a base station device to access, based on the priority updated by the priority determining unit and a reception level of a reception signal for each of the frequency bands which is received from each of the base station devices.

2. The communication system according to claim 1, wherein the priority determining unit is configured to determine, to be the highest priority, the priority for each of the frequency bands which is used by the at least one first base station device from which the service type determining unit chooses to receive the first connection service.

3. The communication system according to claim 1 or 2, wherein the priority stored by the priority storing unit is a priority received from the base station device, and
the priority determining unit is configured to determine, to be the priority received from the base station device, the priority for each of the frequency bands which is used by at least one first base station device from which the service type determining unit chooses to receive the second connection service.

4. The communication system according to claim 1, wherein the base station device comprises:
a priority control information generator configured to generate priority control information to be transmitted to the mobile station device, the priority control information indicating whether or not the mobile station device is to update the priority,
wherein the priority determining unit is configured to update the priority if the priority control information received from the base station device indicates that the priority is to be updated, and
the priority determining unit is configured not to update the priority if the priority control information received from the base station device indicates that the priority is not to be updated.

5. The communication system according to claim 1, wherein the plurality of base station devices include at least one second base station device configured to provide only the first connection service to the mobile station device, and
the priority determining unit is configured to determine, to be lower than a priority for each of the frequency bands which is used by the at least one second base station device, the priority for each of the frequency bands which is used by the at least one first base station device from which the service type determining unit chooses to receive the first connection service.

6. The communication system according to claim 1, wherein the priority determining unit is configured to determine, to be the highest priority, the priority for each of the frequency bands which is used by the at least one first base station device, the first connection service being received from the at least one first base station device which is connected.

7. The communication system according to claim 1, wherein the plurality of base station devices include at least one second base station device configured to provide only the first connection service, and
the priority determining unit is configured to determine, to be lower than a priority for each of the frequency bands which is used by the at least one second base station device, the priority for each of the frequency bands which is used by the at least one first base station device, the first connection service being received from the at least one first base station device which is connected.

8. The communication system according to claim 1, wherein the plurality of base station devices include at least one second base station device configured to provide only the first connection service, and
the priority determining unit is configured to determine, to be identical to a priority for each of the frequency bands which is used by the at least one second base station device, the priority for each of the frequency bands which is used by the at least one first base station device, the first connection service being received from the at least one first base station device which is connected.

9. The communication system according to claim 1, wherein the selection evaluator is configured to select, as a base station device to access, a base station device using a frequency band to be evaluated, if the frequency band to be evaluated is higher in priority than a frequency band used by the base station device connected, and if the reception level with respect to the frequency band to be evaluated is higher than a predetermined threshold,
the selection evaluator is configured to select, as a base station device to access, the base station device using the frequency band to be evaluated, if the frequency band to be evaluated has the same priority to that of the frequency band used by the base station device connected, and if the reception level with respect to the frequency band to be evaluated is higher than the reception level with respect to the frequency band used by the base station device connected, and
the selection evaluator is configured to select, as a base station device to access, the base station device using the frequency band to be evaluated, if the frequency band to be evaluated is lower in priority than the frequency band used by the base station device connected, if the reception level with respect to the frequency band to be evaluated is higher than the predetermined threshold, and if the reception level with respect to the frequency band used by the base station device connected is lower than a predetermined threshold.

10. A mobile station device configured to communicate with a plurality of base station devices including at least one first base station device configured to provide one of first and second connection services to a mobile station device, the second connection service being lower in service quality than the first connection service, the mobile station device comprises:
a priority storing unit configured to store, for each of frequency bands predetermined, a priority for accessing a base station device using one of the associated frequency bands;
a service type determining unit configured to choose, based on identification information received from the at least one first base station device, which of the first and second connection services to receive from each of the at least one first base station device;
a priority determining unit configured to determine, based on a type of a connection service chosen by the service type determining unit, a priority for each of the frequency bands which is used by the at least one first base station device, and to update the priority stored by the priority storing unit based on the priority determined; and
a selection evaluator configured to select a base station device to access, based on the priority updated by the priority determining unit and a reception level of a reception signal for each of the frequency bands which is received from each of the base station devices.

11. A connection destination evaluating method for a mobile station device configured to communicate with a plurality of base station devices including at least one first base station device configured to provide one of first and second connection services to a mobile station device, the second connection service being lower in service quality than the first connection service, the mobile station device comprising a priority storing unit configured to store, for each of frequency bands predetermined, a priority for accessing a base station device using one of the associated frequency bands, the connection destination evaluating method comprising:
a service type determining step for a service type determining unit to choose, based on identification information received from the at least one first base station device, which of the first and second connection services to receive from each of the at least one first base station device;
a priority determining step for a priority determining unit to determine, based on a type of a connection service chosen by the service type determining unit, a priority for each of the frequency bands which is used by the at least one first base station device, and to update the priority stored by the priority storing unit based on the priority determined; and
a selection evaluating step for a selection evaluator to select a base station device to access, based on the priority updated by the priority determining unit and a reception level of a reception signal for each of the frequency bands which is received from each of the base station devices.

12. A connection destination evaluating program causing a computer of a mobile station device configured to communicate with a plurality of base station devices including at least one first base station device configured to provide one of first and second connection services to a mobile station device, the second connection service being lower in service quality than the first connection service, and the mobile station device comprising a priority storing unit configured to store, for each of frequency bands predetermined, a priority for accessing a base station device using one of the associated frequency bands, to function as:
a service type determining unit configured to choose, based on identification information received from the at least one first base station device, which of the first and second connection services to receive from each of the at least one first base station device;
a priority determining unit configured to determine, based on a type of a connection service chosen by the service type determining unit, a priority for each of the frequency bands which is used by the at least one first base station device, and to update the priority stored by the priority storing unit based on the priority determined; and
a selection evaluator configured to select a base station device to access, based on the priority updated by the priority determining unit and a reception level of a reception signal for each of the frequency bands which is received from each of the base station devices.

* * * * *